United States Patent
Wu et al.

(10) Patent No.: US 12,223,078 B2
(45) Date of Patent: Feb. 11, 2025

(54) METHOD TO USE PRIVACY PROTECTION QUERY LANGUAGE PQL TO IMPROVE THE SECURITY OF SHARED DATE

(71) Applicants: Xiang Wu, Jiangsu (CN); Huanhuan Wang, Jiangsu (CN); Lian Liu, Jiangsu (CN); Ruirui Li, Jiangsu (CN); Yu Chen, Jiangsu (CN); Jingyuan Wang, Jiangsu (CN)

(72) Inventors: Xiang Wu, Jiangsu (CN); Huanhuan Wang, Jiangsu (CN); Lian Liu, Jiangsu (CN); Ruirui Li, Jiangsu (CN); Yu Chen, Jiangsu (CN); Jingyuan Wang, Jiangsu (CN)

( * ) Notice: Subject to any disclaimer, the term of this patent is extended or adjusted under 35 U.S.C. 154(b) by 938 days.

(21) Appl. No.: 17/143,182

(22) Filed: Jan. 7, 2021

(65) Prior Publication Data
US 2022/0100887 A1 Mar. 31, 2022

(51) Int. Cl.
*G06F 21/62* (2013.01)
*G06F 16/242* (2019.01)
*G06F 16/2455* (2019.01)

(52) U.S. Cl.
CPC ...... *G06F 21/6227* (2013.01); *G06F 16/2433* (2019.01); *G06F 16/2455* (2019.01); *G06F 21/6245* (2013.01)

(58) Field of Classification Search
CPC ............ G06F 21/6218; G06F 21/6227; G06F 21/6245; G06F 21/6254; G06F 16/24;
(Continued)

(56) References Cited

U.S. PATENT DOCUMENTS

2009/0292877 A1* 11/2009 Piper ............... G06F 16/172
711/E12.017
2017/0169253 A1* 6/2017 Curcio ............. G06F 21/6254
(Continued)

OTHER PUBLICATIONS

Frank D. McSherry, "Privacy integrated queries: an extensible platform for privacy-preserving data analysis," 2009, In Proceedings of the 2009 ACM SIGMOD International Conference on Management of data (SIGMOD '09). Association for Computing Machinery, New York, NY, USA, 19-30 (Year: 2009).*
(Continued)

*Primary Examiner* — Jeremy S Duffield
(74) *Attorney, Agent, or Firm* — Hemisphere Law, PLLC; Zhigang Ma

(57) ABSTRACT

The invention discloses privacy protection query language PQL and system thereof, comprising PQL statement and system, the system comprises parsing module, query module and noise-injection module; the parsing module comprises lexical analyzer and syntactic analyzer; user inputs PQL statement according to predetermined semantic and syntactic rules, after parsing module receives the PQL statement, lexical analyzer performs error checks on the PQL statement, correct results are sent to syntactic analyzer; the syntactic analyzer performs grammatical and semantic checks on PQL statement, generates a mapping table and a parameter table with correct results; after receiving mapping table, the query module encapsulates the same into SQL statement, and verifies the encapsulated SQL statement; the noise-injection module obtains final query results of the query module, calculates noise injection sensitivity according to parameter table; the invention ensures the data privacy security and satisfies that the injected noise does not affect data availability.

6 Claims, 7 Drawing Sheets

(58) Field of Classification Search
CPC ............... G06F 16/242; G06F 16/2433; G06F 16/2448; G06F 16/2455; G06F 16/2458
See application file for complete search history.

(56) References Cited

U.S. PATENT DOCUMENTS

| | | | |
|---|---|---|---|
| 2019/0158594 A1* | 5/2019 | Shadmon | ................ H04L 67/01 |
| 2020/0380159 A1* | 12/2020 | Lilly | ................... G06F 21/6227 |
| 2021/0248143 A1* | 8/2021 | Khillar | ................ G06F 16/2379 |
| 2021/0319131 A1* | 10/2021 | Salomon | ........... G06F 16/24528 |

OTHER PUBLICATIONS

L. Zhang, Y. Liu, R. Wang, X. Fu and Q. Lin, "Efficient privacy-preserving classification construction model with differential privacy technology," Feb. 2017, in Journal of Systems Engineering and Electronics, vol. 28, No. 1, pp. 170-178. (Year: 2017).*

N. Phan, X. Wu, H. Hu and D. Dou, "Adaptive Laplace Mechanism: Differential Privacy Preservation in Deep Learning, " 2017, 2017 IEEE International Conference on Data Mining (ICDM), New Orleans, LA, USA, 2017, pp. 385-394. (Year: 2017).*

* cited by examiner

| Clause | Action | Required/Optional |
|---|---|---|
| PROTECT | specifies query table name | Required |
| PICK | specifies query function name | Required |
| WITH | specifies privacy budget | Alternative |
| WITHRANGE | specifies range of privacy budget | |
| GLOBAL | specifies whether sensitivity is globally calculated | Optional |
| WHERE | specifies query conditions | Optional |

FIG. 5

| Function | Action | Limitation |
|---|---|---|
| Avg[] | obtaining sequence average value | function [] is the sequence field name and supports only one sequence field |
| Total[] | obtaining sequence sum total | |
| Highest[] | obtaining sequence maximum value | |
| Lowest[] | obtaining sequence maximum value | |
| Compute[] | obtaining sequence line number | the sequence field name must be represented by * |

FIG. 6

Mapping table

| Table_Name | Function_Name | Column_Name | Where |
|---|---|---|---|
| Data table name | Query function | Query sequence field name | WHERE clause |

FIG. 9

Parameters Table

| Function_Name | Global | Where | Sensitivity |
|---|---|---|---|
| Query function | Global clause | WHERE clause | Privacy budget |

FIG. 10

METHOD TO USE PRIVACY PROTECTION QUERY LANGUAGE PQL TO IMPROVE THE SECURITY OF SHARED DATE

BACKGROUND OF THE INVENTION

1. Field of the Invention

The invention relates to the field of data security, in particular to a privacy protection query language PQL and a system thereof.

2. Description of the Related Art

In today's network environment, sharing aggregate data is an important way of data reuse, however, due to the high correlation between data, aggregated data is at risk of leaking privacy. Therefore, how to protect the privacy and security of aggregated data has become a major challenge for data sharing.

The differential privacy protection algorithm interferes the calculation results with noise and at the same time guarantees certain data availability, thereby becoming the main privacy protection method in the prior art.

However, because the differential privacy algorithm is too complex to use, and the balance between noise interference and data availability is too professional, the algorithm cannot be directly applied to the database query results, which increases the learning cost of the staff and the cost of writing differential privacy programs.

Therefore, a privacy protection query language PQL and a system thereof has become an urgent problem to be solved.

SUMMARY OF THE INVENTION

The technical problems to be solved by the invention are that the aggregated data in the prior art has the risk of leakage of privacy, also the differential privacy algorithm is too complicated to be directly applied to the database query results, and the algorithm increases the learning cost of the staff and the cost of writing differential privacy programs.

In order to solve above technical problems, the invention provides the following technical schemes: a privacy protection query language PQL and a system thereof, comprising PQL statement and system;

the PQL statement comprises: PROTECT clause, PICK clause, WITH clause, WITHRANGE clause, GLOBAL clause, and WHERE clause;
the system comprises a parsing module, a query module and a noise-injection module;
the parsing module comprises a lexical analyzer and a syntactic analyzer;
the user inputs the PQL statement according to predetermined semantic and syntactic rules and sends the same to the parsing module, after the parsing module receives the PQL statement, the PQL statement is checked for errors through the lexical analyzer, correct results are sent to the syntactic analyzer, otherwise, incorrect contents are pointed out;
the syntactic analyzer performs grammatical and semantic checks on the PQL statement, generates a mapping table and a parameter table with the correct results and sends to the query module and the noise-injection module respectively, otherwise, incorrect contents are pointed out;
after receiving the mapping table, the query module encapsulates the same into an SQL statement, and verifies the encapsulated SQL statement, the SQL statement is connected to the database for query, and final query results are sent to the noise-injection module;
the noise-injection module obtains the final query results of the query module, calculates noise injection sensitivity according to the parameter table, and substitutes real query results, sensitivity, and privacy budget into underlying differential privacy algorithm function for noise injection, and thereafter the results after noise injection is returned.

Further, the PROTECT clause and the PICK clause are first required clauses;
the WITH clause and the WITHRANGE clause are second required clauses;
the GLOBAL clause and the WHERE clause are optional clauses.

Further, the PQL statement also comprises aggregate functions comprising Avg[ ], Total[ ], Highest[ ], Lowest[ ] and Compute[ ];
wherein
the Avg[ ] is sequence average value function;
the Total[ ] is sequence sum total function;
the Highest[ ] is sequence maximum value function;
the Lowest[ ] is sequence maximum value function;
the Compute[ ] is sequence line number function.

Further, the method for the query module to verify the encapsulated SQL statement is as follows:
Step 1: determining whether there is a WHERE clause, if yes, dividing the WHERE clause into first part and second part, if no, the entire SQL statement is the first part;
Step 2: extracting the name of data table and field name of sequence in the first part to perform validity verification respectively, and if the second part exists after the verification is successful, performing verification on the second part;
Step 3: verifying the field name, operator of sequence and field data type of actual sequence in the second part.

Further, the calculation process of noise injection sensitivity is as follows:
Step 1: determining whether the query function is a sequence function according to the parameter table, if yes, the sensitivity is a fixed value of 1, and the sensitivity is returned, if no, taking next step;
Step 2: determining whether there is a global clause according to the parameter table, if yes, ignoring the WHERE clause and using all data in the corresponding sequence field as sensitivity basis, if no, using the data filtered by the WHERE clause conditions as the sensitivity basis;
Step 3: calculating corresponding sensitivity according to the different query functions and sensitivity basis in the parameter table, and returning the sensitivity to the next step.

Further, the mapping table comprising query data table name, query function, query sequence field name and WHERE clause.

Further, the parameter table comprises query function, global clause, WHERE clause and privacy budget.

Compared to the prior art, the invention has the following advantageous effects: the invention guarantees the security of shared data through the cooperation of PQL statements and the system, and simultaneously satisfies that the injected noise does not affect the usability of data; the invention reduces the learning cost of differential privacy to a large extent, also, reduces the difficulty degree of writing differential privacy programs; moreover, the invention has a reasonable design and is worthy of vigorous promotion.

BRIEF DESCRIPTION OF THE DRAWINGS

FIG. 5 shows clause rules of predetermined semantic and syntactic rules of the PQL statement in the invention;

FIG. 6 shows function rules of predetermined semantic and syntactic rules of the PQL statement in the invention;

FIG. 9 shows specific format of the mapping table in the invention;

FIG. 10 shows specific format of the parameter table in the invention.

DETAILED DESCRIPTION OF THE PREFERRED EMBODIMENTS

Figure 1:
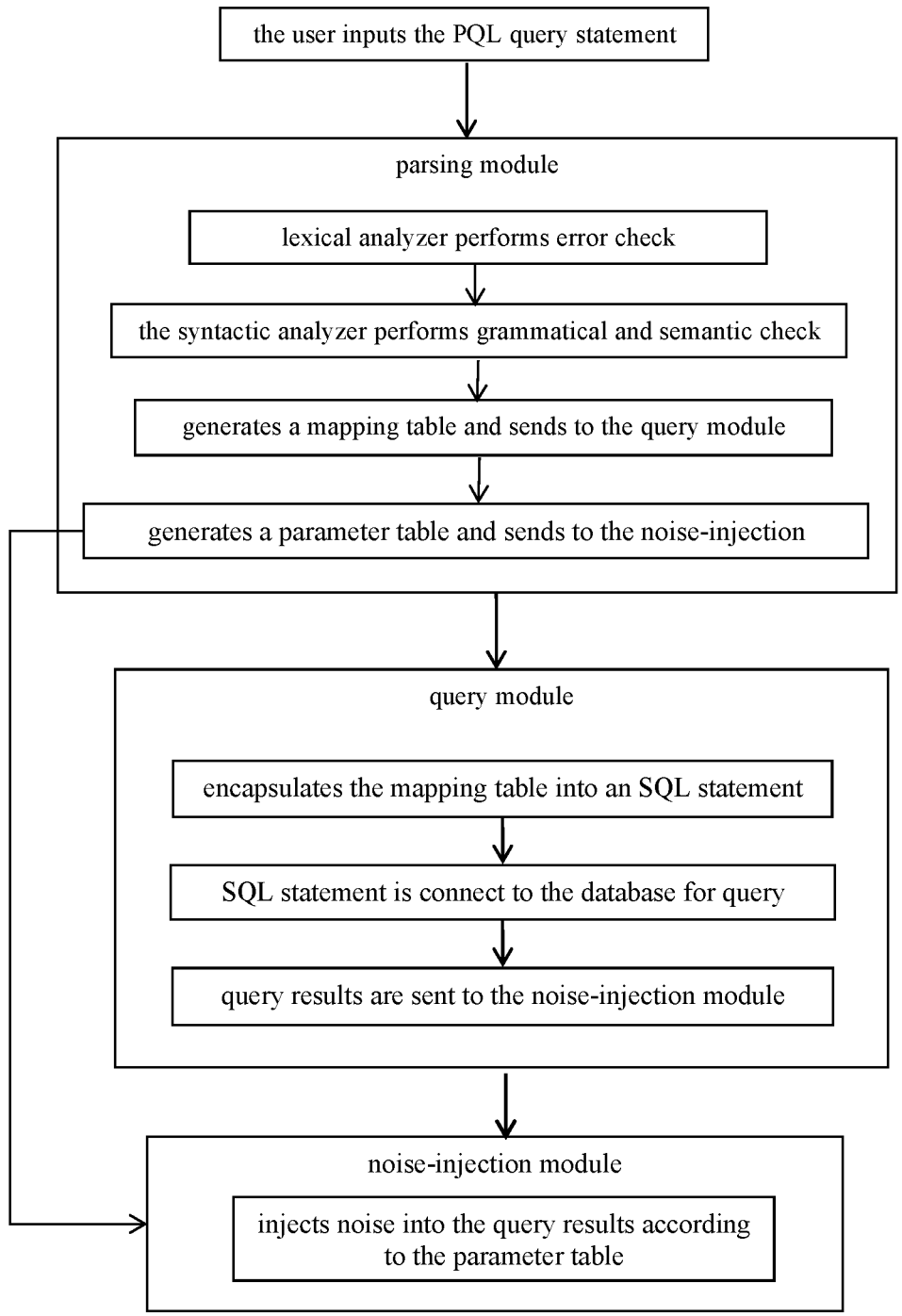
FIG. 1 is a flowchart showing the privacy protection query language PQL and system thereof.

The invention will be further described in detail below with reference to accompanying drawings.

The invention is described in detail by combining FIG. 1-10.

The concept related in the invention: PQL is the abbreviation of Protection Query Language, the parsing module encapsulates PQL statement with predetermined semantic and syntactic rules into corresponding SQL statement, after querying database, the differential privacy algorithm is combined to inject noise to the query results, which can effectively solve the problem of shared data privacy leakage to protect the query language.

In specific embodiment, the invention provides a privacy protection query language PQL and a system thereof, comprising PQL statement and system;
  the PQL statement comprises: PROTECT clause, PICK clause, WITH clause, WITHRANGE clause, GLOBAL clause, and WHERE clause;
  the system comprises a parsing module, a query module and a noise-injection module;
  the parsing module comprises a lexical analyzer and a syntactic analyzer;
  the user inputs the PQL statement according to predetermined semantic and syntactic rules and sends the same to the parsing module, after the parsing module receives the PQL statement, the PQL statement is checked for errors through the lexical analyzer, correct results are sent to the syntactic analyzer, otherwise, incorrect contents are pointed out;
  the syntactic analyzer performs grammatical and semantic checks on the PQL statement, generates a mapping table and a parameter table with the correct results, and sends to the query module and the noise-injection module respectively, otherwise, incorrect contents are pointed out;
  after receiving the mapping table, the query module encapsulates the same into an SQL statement, and verifies the encapsulated SQL statement, SQL statement is connected to the database for query, and final query results are sent to the noise-injection module;
  the noise-injection module obtains the final query results of the query module, calculates noise injection sensitivity according to the parameter table, and substitutes real query results, sensitivity, and privacy budget into underlying differential privacy algorithm function for noise injection, and then the results after noise injection is returned.
  the PROTECT clause and the PICK clause are first required clauses;
  the WITH clause and the WITHRANGE clause are second required clauses;
  the GLOBAL clause and the WHERE clause are optional clauses.
  the PQL statement also comprises aggregate functions comprising Avg[ ], Total[ ], Highest[ ], Lowest[ ] and Compute[ ];
wherein:
  the Avg[ ] is sequence average value function;
  the Total[ ] is sequence sum total function;
  the Highest[ ] is sequence maximum value function;
  the Lowest[ ] is sequence maximum value function;
  the Compute[ ] is sequence line number function.

The method for the query module to verify the encapsulated SQL statement is as follows:
  Step 1: determining whether there is a WHERE clause, if yes, dividing the WHERE clause into first part and second part, if no, the entire SQL statement is the first part;
  Step 2: extracting the name of data table and field name of sequence in the first part to perform validity verification respectively, and if the second part exists after the verification is successful, performing verification on the second part;
  Step 3: verifying the field name, operator of sequence and field data type of actual sequence in the second part.

The calculation process of noise injection sensitivity is as follows:
  Step 1: determining whether the query function is a sequence line number function according to the parameter table, if yes, the sensitivity is a fixed value of 1, and the sensitivity is returned, if no, taking next step;
  Step 2: determining whether there is a global clause according to the parameter table, if yes, ignoring the WHERE clause and using all data in the corresponding sequence field as sensitivity basis, if no, using the data filtered by the WHERE clause conditions as the sensitivity basis;
  Step 3: calculating corresponding sensitivity according to the different query functions and sensitivity basis in the parameter table, and returning the sensitivity to the next step.

The mapping table comprising query data table name, query function, query sequence field name and WHERE clause.

The parameter table comprises query function, global clause, WHERE clause and privacy budget.

The specific implementation process of the privacy protection query language PQL and system thereof in the invention is as follows:
  as shown in FIG. 1, the system comprises a parsing module, a query module and a noise-injection module; the parsing module comprises a lexical analyzer and a syntactic analyzer;
  after the user inputting the PQL query statement, the lexical analyzer in the parsing module performs error check, after the check, the syntactic analyzer performs grammatical and semantic checks to generate a mapping table and a parameter table, and sends to the query module and the noise-injection module respectively; thereafter, the query module encapsulates the mapping table into an SQL statement, the SQL statement is connected to the database for data query, and final query results are sent to the noise-injection module; finally, the noise-injection module injects noise into the query results according to the parameter table and returns the same for business needs.

Figure 2:
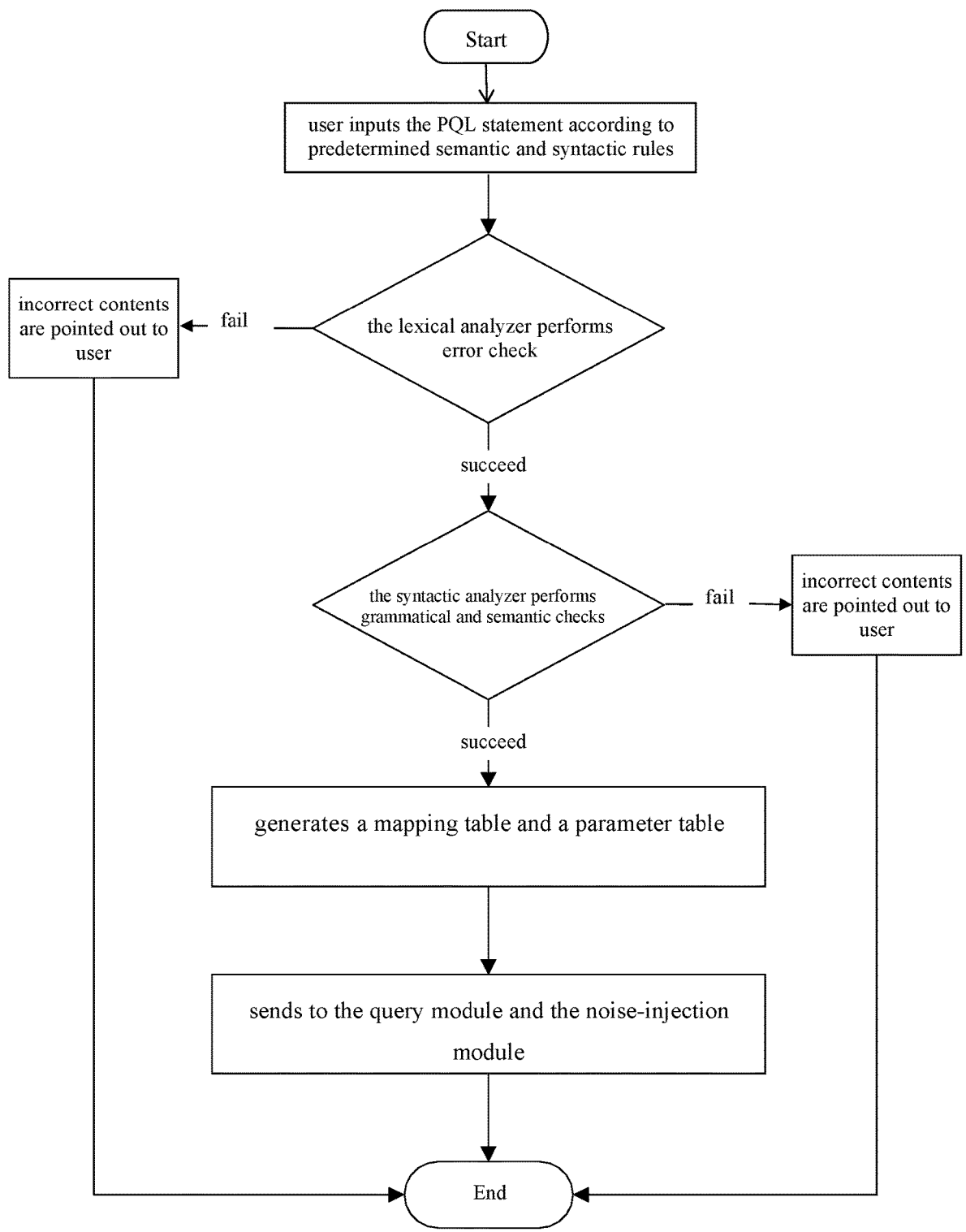
FIG. 2 is a flowchart showing the parsing module parsing PQL statement in the invention.
Figure 3:
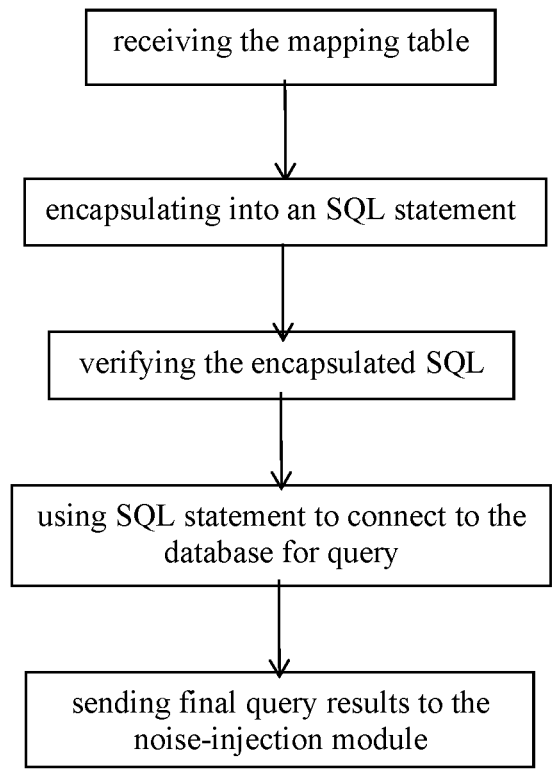
FIG. 3 is a flowchart showing the query module querying data in the invention.
Figure 4:
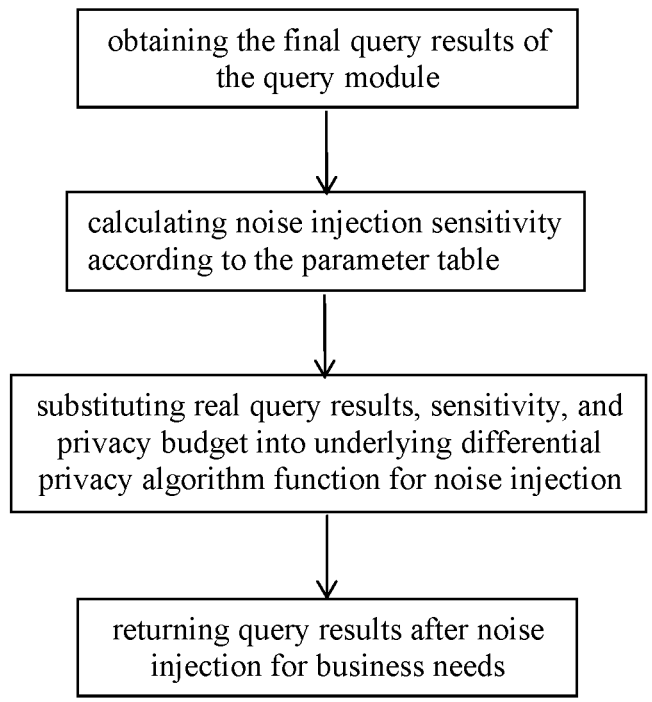
FIG. 4 is a flowchart showing the noise-injection module injecting noise to query result in the invention.

As showing in FIG. 2, the process of parsing PQL statements by the parsing module is as follows:
(1) user inputs the PQL statement according to predetermined semantic and syntactic rules and sends the same to the parsing module;
(2) after the parsing module receives the PQL statement, the PQL statement is checked for errors through the lexical analyzer, correct results are sent to the syntactic analyzer, otherwise, incorrect contents are pointed out;
(3) the syntactic analyzer performs grammatical and semantic checks on the PQL statement, incorrect contents are pointed out, otherwise, a mapping table and a parameter table with the correct results are generated and sent to the query module and the noise-injection module respectively;

As showing in FIG. 3, the process of data query of the query module is as follows:
(1) after receiving the mapping table, the query module encapsulates the same into an SQL statement;
(2) verifies the encapsulated SQL statement;
(3) SQL statement is connected to the database for query;
(4) final query results are sent to the noise-injection module;

As showing in FIG. 4, the process of injecting noise to query result by the noise-injection module is as follows:
(1) obtains the final query results of the query module;
(2) calculates noise injection sensitivity according to the parameter table;
(3) substitutes real query results, sensitivity, and privacy budget into underlying differential privacy algorithm function for noise injection;
(4) the results after noise injection is returned.

As showing in FIG. 5, the clause rules of predetermined semantic and syntactic rules of the PQL statement are as follows:
(1) the PQL statement comprises PROTECT clause, PICK clause, WITH clause, WITHRANGE clause, GLOBAL clause, and WHERE clause;
(2) the PROTECT clause and the PICK clause are first required clauses, the WITH clause and the WITHRANGE clause are second required clauses, the GLOBAL clause and the WHERE clause are optional clauses;
(3) the PROTECT clause specifies query table name, the PICK clause specifies query function name, the WITH clause specifies privacy budget, the WITHRANGE clause specifies range of privacy budget, the GLOBAL clause specifies whether sensitivity is globally calculated and the WHERE clause specifies query conditions.

As shown in FIG. 6, function rules of predetermined semantic and syntactic rules of the PQL statement are as follows:
(1) the PQL statement comprises aggregate functions comprising Avg[ ], Total[ ], Highest[ ], Lowest[ ] and Compute[ ];
(2) the Avg[ ] is sequence average value function, the Total[ ] is sequence sum total function, the Highest[ ] is sequence maximum value function, the Lowest[ ] is sequence maximum value function, the Compute[ ] is sequence line number function;
(3) function [ ] is the sequence field name and supports only one sequence field;
(4) the sequence field name in the Compute[ ] of the PQL statement must be represented by *.

Figure 7:
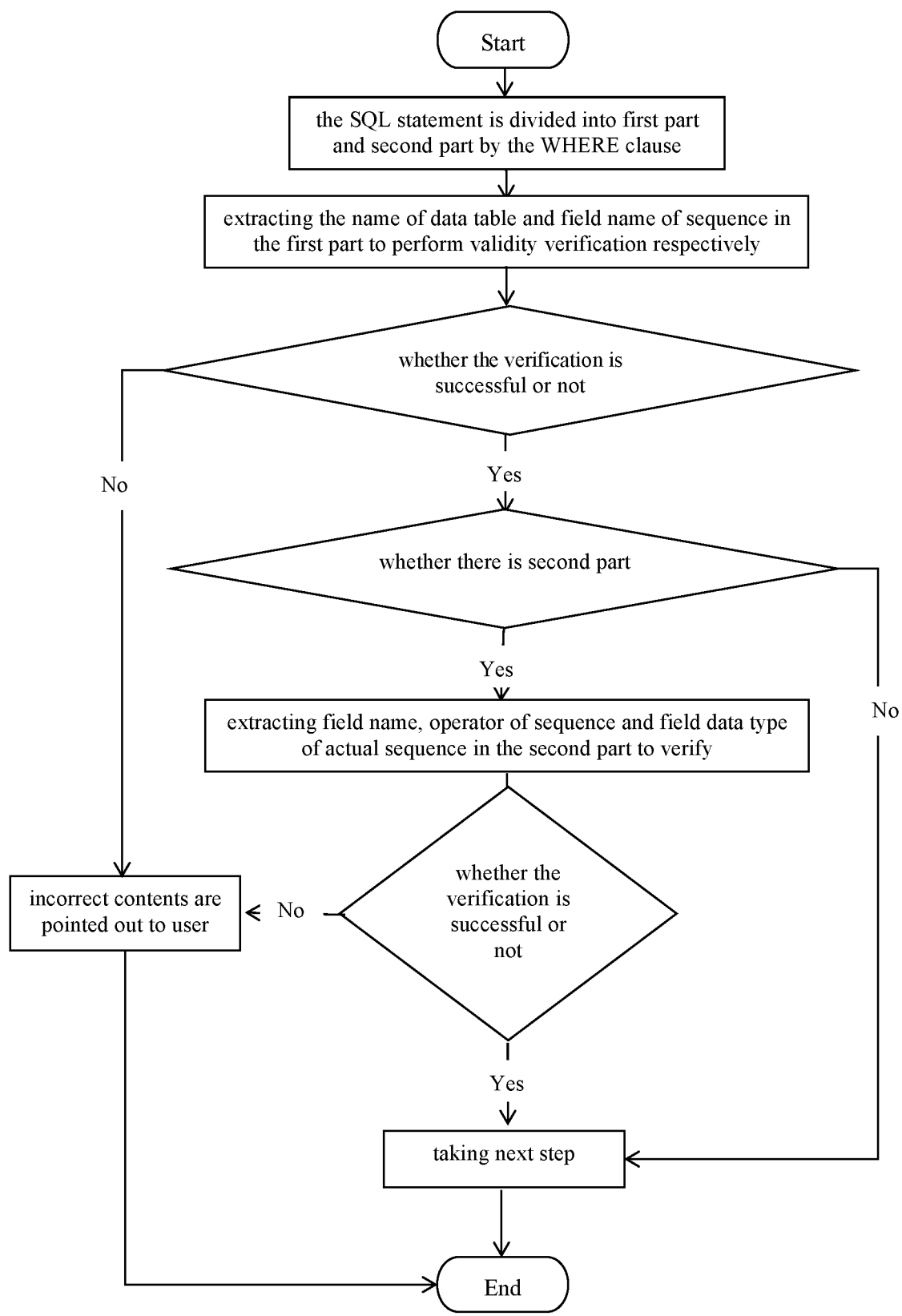
FIG. 7 is a flowchart showing verification on encapsulated SQL statement in the invention.
Figure 8:
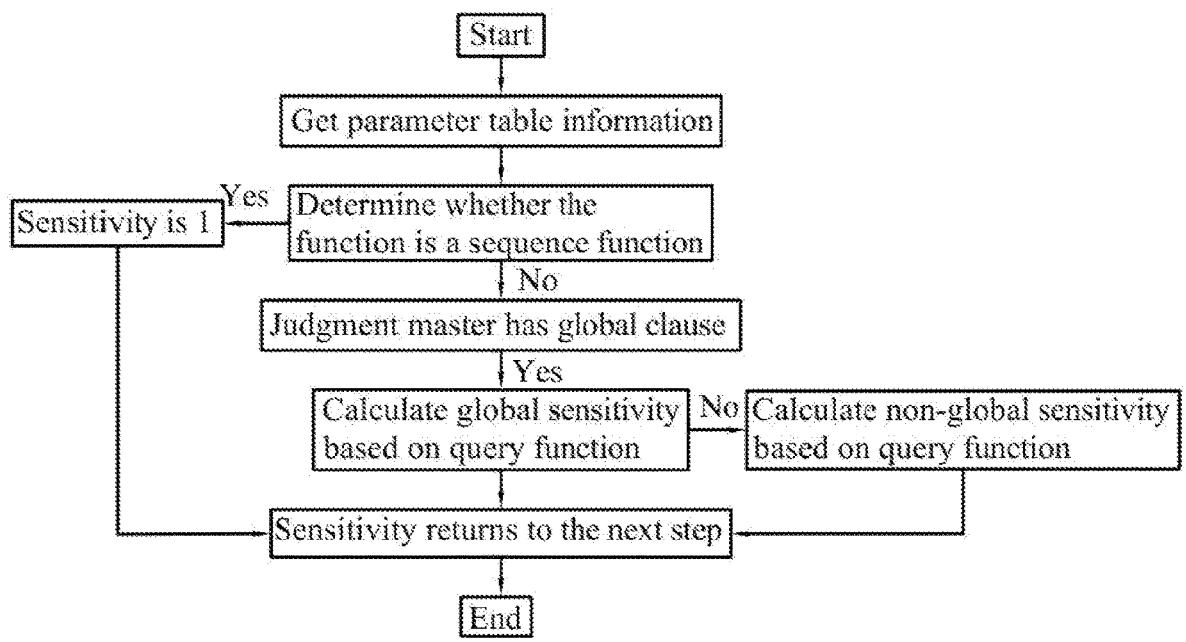
FIG. 8 is a flowchart showing the calculation of noise-injection sensitivity in the invention.

As shown in FIG. 7, the process of verification on encapsulated SQL statement is as follows:
(1) the SQL statement is divided into first part and second part by the WHERE clause, if there is no WHERE clause, there is no need to divide, and the entire SQL statement is the first part;
(2) extracting the name of data table and field name of sequence in the first part to perform validity verification respectively, if the verification is unsuccessful, the error contents are point out for user, and if the second part exists after the verification is successful, performing verification on the second part;
(3) if there is a second part, verifying the field name, operator of sequence and field data type of actual sequence in the second part, if the verification is unsuccessful, the error contents are point out for user, and if the verification is successful, proceeds to the next step;

As shown in FIG. 8, the calculation process of the noise injection sensitivity is as follows:
(1) determining whether the query function is a sequence line number function according to the parameter table, if yes, the sensitivity is a fixed value of 1, and the sensitivity is returned, if no, taking next step;
(2) determining whether there is a global clause according to the parameter table, if yes, ignoring the WHERE clause and using all data in the corresponding sequence field as sensitivity basis, if no, using the data filtered by the WHERE clause conditions as the sensitivity basis
(3) calculating corresponding sensitivity according to the different query functions and sensitivity basis in the parameter table, and returning the sensitivity to the next step.

As shown in FIG. 9-10, the specific format of the mapping table and parameter table is as follows:
(1) mapping table: query data table name, query function, query sequence field name and WHERE clause;
(2) parameter table: query function, global clause, WHERE clause and privacy budget.

The embodiments are described below:
PQL syntax comprises two parts, one is basic syntax clause, which refers to various statistical query functions supported by PQL; the other is the parameter setting syntax clause of the differential privacy protection algorithm, which refers to the corresponding privacy budget and sensitivity parameters chosen by data analyst according to the wanted degree of privacy protection;
the complete PQL syntax is shown below:
PROTECT protect_table|name
PICK pick_fun|column
WITH with_specific ε
[OR WITHRANGE(X,Y) withrange(x,y)_range of ε]
[Global global_global sensitivity+[WHERE where_condition]]
[WHERE where_condition]
wherein [ ] refers to optional clause.

The operators and functions supported by PQL are shown in Table 1:

TABLE 1

| | | instruction |
|---|---|---|
| operator | = | equal to |
| | < | less than |
| | > | greater than |
| | <= | less than or equal to |
| | >= | greater than or equal to |
| | != | unequal to |
| | and | and |
| | or | or |
| function | Total [column_name] | sum total |
| | Highest [column_name] | maximum |
| | Lowest[column_name] | minimum |
| | Count [*] | line number |
| | Avg [column_name] | average |

Main components of the PQL syntax are shown below:
(1) PROTECT Clause

With the same as the function of the table name contained in the SELECT clause in the SQL statement, each PROTECT clause in the PQL query language must contain a noise-injection table name (protect_table|name), as shown in embodiment 1: HCV patient data table for a certain period:

Embodiment 1: Protect HCV;

(2) PICK Clause

Each PICK clause must select a statistical query function according to the selected field, such as sum total and average function in Table 1, for example embodiment 2: average hospitalization expense in a certain period of time:

Embodiment 2: Protect expenses Pick Avg [total];

(3) WITH or WITHRANGE Clause

The user is required by each WITH clause to select a specific privacy budget value from the range (0,1) to input thereinto; the user is required by each WITHRANGE clause to select a specific privacy budget range from the range (0,1) to input thereinto; in the specific operation process, the user can select one of the WITH clause and WITHRANGE clause, which indicates the size of the privacy budget $\varepsilon$ that the user wants to add to the query result; as shown in embodiment 3 and embodiment 4: average body mass index of HCV patients:

Embodiment 3: Protect HCV Pick Avg [BMI] With 0.6;
Embodiment 4: Protect HCV Pick Avg [BMI] Withrange (0.4,0.7);

(4) WHERE clause and Global clause

The WHERE clause belongs to optional clause, indicates the attached conditions when to querying the table, which is generally used with the Global clause. The Global clause represents the global sensitivity in differential privacy, after the user selects the Global clause, PQL calculates the sensitivity based on all records to inject noise using the differential privacy protection algorithm. As shown in embodiment 5 and embodiment 6: average hospitalization expenses for a hospital with more than 10 days of hospitalization:

Embodiment 5: Protect expenses Pick Avg [total] With 0.8 Where day>10;
Embodiment 6: Protect expenses Pick Avg [total] With 0.8 Global Where day>10;

(5) Sensitivity Calculation

In the process of injecting noise to the original data, the noise-injection module uses the Laplace mechanism to disturb the original data, and the injected noise is: $\lambda=\Delta f/\varepsilon$, wherein $\lambda$ refers to amount of injected noise, $\varepsilon$ refers to privacy budget, $\Delta f$ refers to sensitivity, the privacy budget requires the user to use the WITH or WITHRANGE clause to define according to own needs, the sensitivity will be automatically matched according to the different functions used by the user, the calculation methods for different functions are as follows:

1) Compute[ ] sequence line number function: according to the definition of Laplace mechanism, counting statistical sensitivity is a fixed value of 1, that is $\Delta f=1$;
2) Total[ ] sequence sum total function: according to the definition of Laplace mechanism, sum statistical sensitivity is the absolute value of the maximum value in the query sequence, that is $\Delta f=|N_{Max}|$;
3) Highest[ ] sequence maximum value function: according to the definition of Laplace mechanism, maximum statistical sensitivity is the absolute value of the maximum value minus the sub-maximum value in the query sequence, that is $\Delta f=|N_{Max}-N_{Sub-Max}|$;
4) Lowest[ ] sequence minimum value function: according to the definition of Laplace mechanism, minimum statistical sensitivity is the absolute value of the minimum value minus the sub-minimum value in the query sequence, that is $\Delta f=|N_{Min}-N_{Sub-Min}|$;
5) Avg[ ] sequence average value function: according to the definition of Laplace mechanism, the calculation process of average statistical sensitivity is as follows:
   a. calculating the average value of query sequence $Avg_1$;
   b. obtaining the maximum value Max and the minimum value Min in the query sequence;
   c. obtaining the maximum difference $c_1=|Avg_1-Min|$, obtaining the minimum difference $c_2=|Max-Avg_1|$;
   d. obtaining the sum total Sum and sequence line number Count of the query sequence;
   e. if $c_1-c_2>0$, the maximum difference D=Min, if $c_1-c_2\leq 0$, the maximum difference D=Max;
   f. obtaining the average value after deleting the maximum difference $$Avg_2 = \frac{Sum-D}{Count-1};$$

g. sensitivity $\Delta f=|Avg_2-Avg_1|$.

As shown in Table 2, there are some student scores of a school:

| Student No. | Name | Total score |
|---|---|---|
| 20180012315 | Student 1 | 468 |
| 20180012316 | Student 2 | 454 |
| 20180012317 | Student3 | 493 |
| 20180012318 | Student4 | 479 |
| 20180012319 | Student5 | 488 |
| 20180012320 | Student6 | 426 |
| 20180012321 | Student7 | 447 |
| 20180012322 | Student8 | 482 |
| 20180012323 | Student9 | 467 |
| 20180012324 | Student10 | 475 |

The sensitivity in different query functions is calculated as follows:
1) querying the number of students with a score of 450 or above by using the Compute[ ] sequence line number function, and the sensitivity is a fixed value of 1, that is $\Delta f=1$;

2) querying the sum of scores by using the Total[ ] sequence sum total function, the sensitivity is the absolute value of the maximum value in the query sequence, that is $\Delta f=493$;
3) querying the highest score by using the Highest[ ] sequence maximum value function, and the sensitivity is the absolute value of the maximum value minus the sub-maximum value in the query sequence, that is $\Delta f=|493-488|$, that is $\Delta f=5$;
4) querying the lowest score by using the Lowest[ ] sequence minimum value function, and the sensitivity is the absolute value of the minimum value minus the sub-minimum value in the query sequence, that is $\Delta f=|426-447|$, that is $\Delta f=21$;
5) querying the average score by using the Avg[ ] sequence average value function, the calculation of the sensitivity is as follows:
a. calculating the average value of query sequence Avg1=467.9;
b. obtaining the maximum value and the minimum value in the query sequence, Max=493, Min=426;
c. obtaining the maximum difference $c_1=|467.9-426|$, $c_1=41.9$, the minimum difference $c_2=|493-467.9|$, $c_2=25.1$;
d. obtaining the sum total Sum=4679 and sequence line number Count=10 of the sequence;
e. because c1−c2=41.9−25.1>0, the maximum difference D=Min, that is D=426;
f. the average value after deleting the maximum difference $$Avg_2 = \frac{Sum - D}{Count - 1} = \frac{4679 - 426}{10 - 1} = 472.55;$$

g. sensitivity $\Delta f=|Avg2- Avg_1|=|472.55-467.9|=4.65$, that is $\Delta f=4.65$.

The invention encapsulates the PQL statements of predetermined semantic and syntactic rules into corresponding SQL statements through the parsing module, after querying database, the differential privacy algorithm is combined to inject noise to the query results, which not only can effectively solve the problem of shared data privacy leakage, but also greatly reduces the difficulty of using algorithms in differential privacy.

The invention and the embodiments thereof are described above, and the description is not restrictive, and the actual structure is not limited thereto. In short, any structural methods and embodiments similar to the invention designed by those skilled in the art inspired by the invention, without departing the spirit of the invention and without any creative design, should be included in the protection scope of the invention.

The literature referenced by the Laplace mechanism are as follows:

[Serial No.] Main responsible person. Literature title [D]. Place of publication: Publisher, publication year: Page number:

[1] Cynthia Dwork, Aaron Roth. The Algorithmic Foundations of Differential Privacy [M]. Now Publishers Inc. 2014: 30-37.

[2] Phan N H, Wu X, Hu H, et al. Adaptive Laplace Mechanism: Differential Privacy Preservation in Deep Learning[J]. arXiv, 2017:386-387.

What is claimed is:
1. A method to use privacy protection query language (PQL) to improve the security of shared data, comprising the following steps:
   Step 1: a user inputs a PQL statement according to predetermined semantic and syntactic rules and sends the PQL statement to a parsing module, wherein the PQL statement comprises: a PROTECT clause, a PICK clause, a WITH clause, a WITHRANGE clause, a GLOBAL clause, and a WHERE clause, wherein the parsing module comprises a lexical analyzer and a syntactic analyzer, wherein the PQL statement is checked for errors through the lexical analyzer, and correct results are sent to the syntactic analyzer, otherwise, incorrect contents are pointed out;
   Step 2: the syntactic analyzer performs grammatical and semantic checks on the PQL statement, generates a mapping table and a parameter table with correct results of the grammatical and semantic checks, and sends the mapping table and the parameter table to a query module and a noise-injection module respectively, otherwise, incorrect contents are pointed out; and
   Step 3: after receiving the mapping table, the query module encapsulates the mapping table into a SQL statement, said SQL statement is connected to a database for query, and final query results are sent to the noise-injection module.

2. The method to use privacy protection query language (PQL) to improve the security of shared data of claim 1, wherein the PQL statement also comprises:
   aggregate functions comprising Avg [ ], Total [ ], Highest [ ], Lowest [ ] and Compute [ ];
   wherein:
   the Avg [ ] is sequence average value function;
   the Total [ ] is sequence sum total function;
   the Highest [ ] is sequence maximum value function;
   the Lowest [ ] is sequence minimum value function; and
   the Compute [ ] is sequence line number function.

3. The method to use privacy protection query language (PQL) to improve the security of shared data of claim 1, comprising:
   a method for the query module to verify the encapsulated SQL statement as follows:
   Step 1: determining whether there is said WHERE clause, if yes, dividing the WHERE clause into a first part and a second part, if no, the entire SQL statement is the first part;
   Step 2: extracting a name of a data table and a field name of a sequence in the first part to perform validity verification respectively, and if the second part exists after the verification is successful, performing verification on the second part; and
   Step 3: verifying the field name, an operator of the sequence, and a field data type of an actual sequence in the second part.

4. The method to use privacy protection query language (PQL) to improve the security of shared data of claim 1, comprising:
   a calculation process of noise injection sensitivity as follows:
   Step 1: determining whether a query function is a sequence line number function according to the parameter table, if yes, the sensitivity is a fixed value of 1, and the sensitivity is returned, if no, taking next step;
   Step 2: determining whether there is said global clause according to the parameter table, if yes, ignoring the WHERE clause and using all data in a corresponding sequence field as a sensitivity basis, if no, using data filtered by the WHERE clause conditions as the sensitivity basis; and Step 3: calculating the corresponding sensitivity according to different query functions and the sensitivity basis in the parameter table, and returning the sensitivity to the next step.

5. The method to use privacy protection query language (PQL) to improve the security of shared data of claim 1, wherein the mapping table comprising a query data table name, a query function, a query sequence field name, and said WHERE clause.

6. The method to use privacy protection query language (PQL) to improve the security of shared data of claim 1, wherein the parameter table comprises a query function, said global clause, said WHERE clause, and a privacy budget.

* * * * *